(12) United States Patent
Gerhard

(10) Patent No.: US 6,599,072 B1
(45) Date of Patent: Jul. 29, 2003

(54) CORROSION RESISTING SCREW WITH CUTTING INSERT

(75) Inventor: Anton Gerhard, Nürnberg (DE)

(73) Assignee: Toge-Dübel A. Gerhard KG, Nürnberg (DE)

( * ) Notice: Subject to any disclaimer, the term of this patent is extended or adjusted under 35 U.S.C. 154(b) by 0 days.

(21) Appl. No.: 09/831,707

(22) PCT Filed: Nov. 4, 1999

(86) PCT No.: PCT/EP99/08458
  § 371 (c)(1),
  (2), (4) Date: Aug. 13, 2001

(87) PCT Pub. No.: WO00/29754
  PCT Pub. Date: May 25, 2000

(30) Foreign Application Priority Data

Nov. 13, 1998 (DE) .......................... 198 52 338

(51) Int. Cl.⁷ ............................... F16B 25/10
(52) U.S. Cl. ................... 411/387.4; 411/311; 408/230
(58) Field of Search ................ 411/386, 387.1–387.8, 411/308–311, 411, 424, 900, 304; 408/230

(56) References Cited

U.S. PATENT DOCUMENTS 4,883,135 A * 11/1989 Moser et al. ............... 175/323
4,896,391 A * 1/1990 Rowley ..................... 411/216
5,141,376 A * 8/1992 Williams et al. ......... 411/387.4
5,385,439 A    1/1995 Hurdle

FOREIGN PATENT DOCUMENTS

WO    WO 96/16274 A1    5/1996

* cited by examiner

Primary Examiner—Flemming Saether
Assistant Examiner—Jori Schiffman
(74) Attorney, Agent, or Firm—Browdy and Neimark, P.L.L.C.

(57) ABSTRACT

A corrosion-resisting, self-tapping screw (1), in particular a concrete screw, to be driven into a bore, which has a wall, comprises a substantially cylindrical core (2) of corrosion-resisting metal with a central longitudinal axis (8); a thread (5), which is integral with the core (2); and at least one cutting element (9), which has at least one cutting head (12) for cutting engagement with the wall of the bore; the at least one cutting element (9) being inserted in the core (2), tightly joined thereto and consisting of a hardened metal, and the at least one cutting head (12) being arranged in the thread (5).

7 Claims, 3 Drawing Sheets

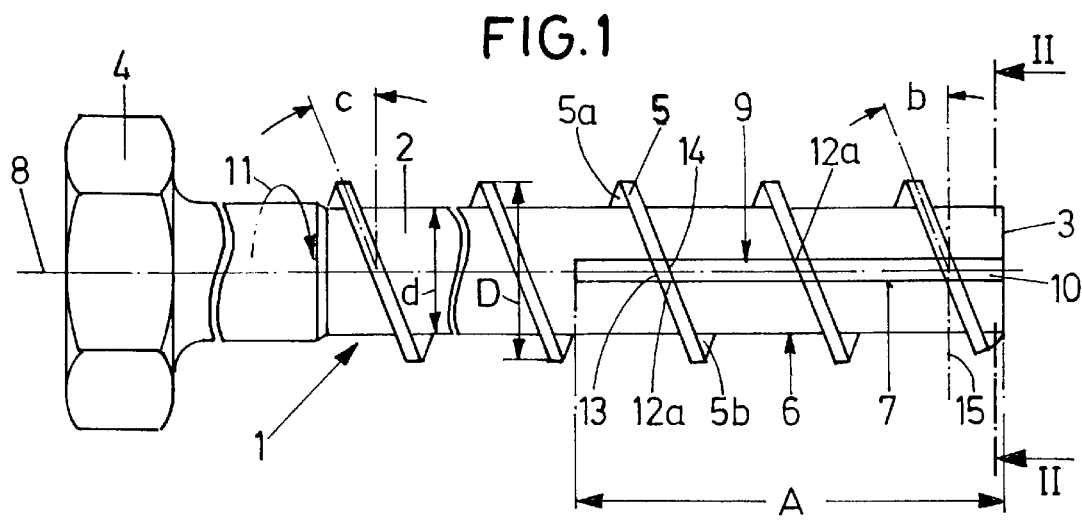
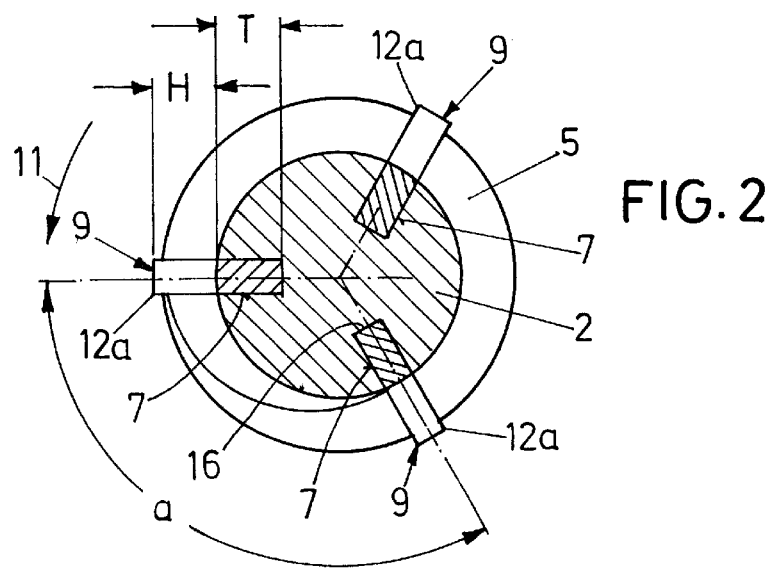
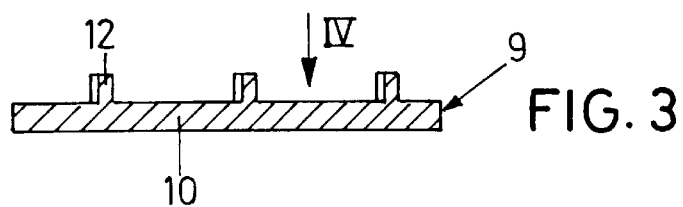
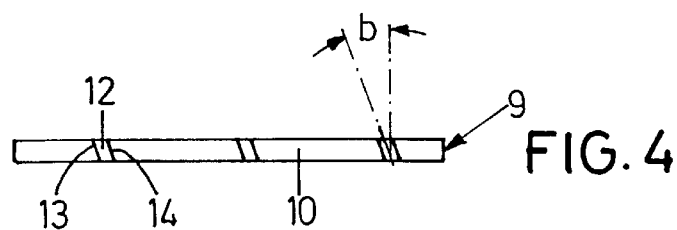

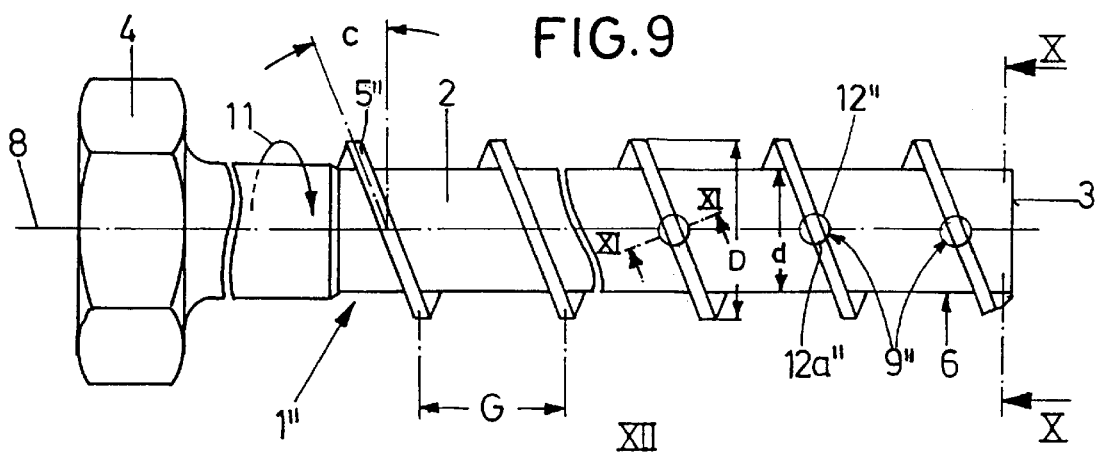
FIG.9
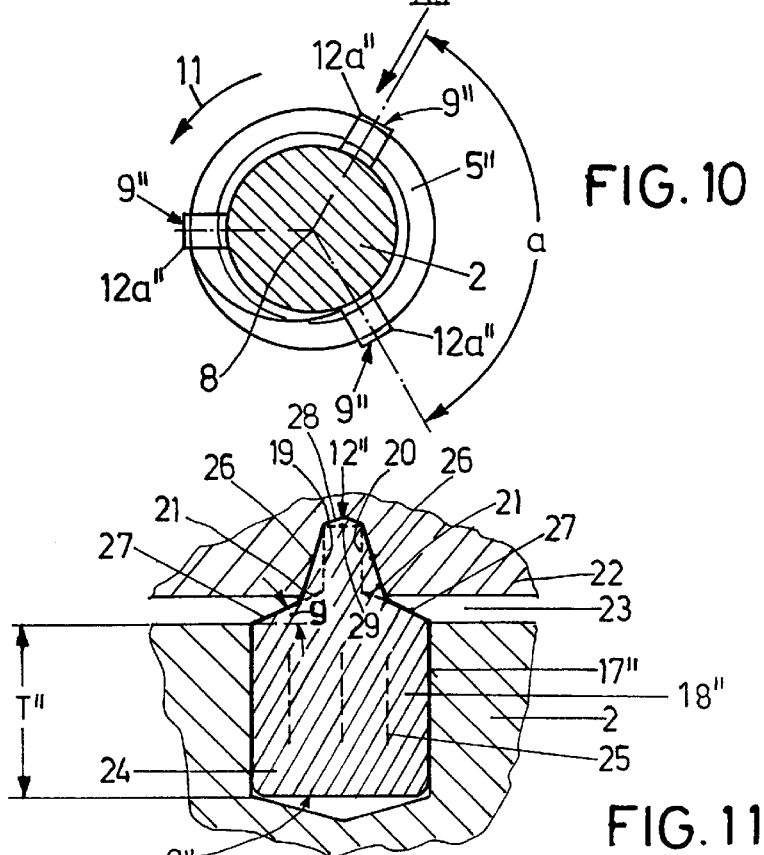
FIG.10
FIG.11
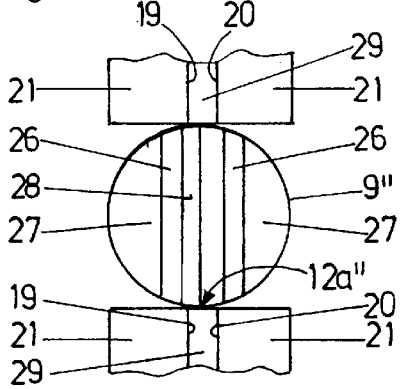
FIG.12

CORROSION RESISTING SCREW WITH CUTTING INSERT

REFERENCE TO RELATED APPLICATIONS

The present application is the national stage under 35 U.S.C. §371 of international application PCT/EP99/08458, filed Nov. 4, 1999 which designated the United States, and which application was not published in the English language.

BACKGROUND OF THE INVENTION

1. Technical Field of the Invention

The invention relates to a corrosion-resisting, self-tapping screw.

2. Prior Art

A screw is known from DE 44 17 921 A1. It consists of a first screw member of corrosion-resisting steel and of a second screw member of hardened steel which is attached to the end of the first screw member. The two screw members are non-positively joined to each other, having a thread on their circumference. This design has the drawback that the connection between the first and the second screw member is destroyed substantially perpendicularly to the central longitudinal axis in the case of high screw-in forces acting on the thread.

WO 96/16274 teaches a self-cutting screw of the generic type. It has a cylindrical core with an axial groove provided therein, the depth of which reaches as far as to the central longitudinal axis, in some embodiments passing entirely through the core. A flat elongated insertion is inserted in the groove. The thread of the screw is designed so that the thread, which forms one piece with the core, blends harmoniously with the thread profile along the insertion. Manufacture of the screw is such that a pre-punched, flat insertion of durable steel is inserted and fixed in a substantially cylindrical screw shaft of stainless steel with an axial groove. Then the thread is formed for instance by rolling, which is followed by the hardening of the insertion. The known screw has numerous drawbacks. Since the depth of the axial groove reaches as far as to, and in part beyond, the central longitudinal axis, the core is partially severed thereby, its screw-in stability thus being strongly impaired. In particular concrete screws, when screwed in, require very high torques which act on the core. Furthermore, hardened cutting elements may be produced in the thread only along a single or maximally along two opposite surface lines, further severing of the core, for instance by grooves that are offset from each other by 120°, not being possible. Even in the case of two opposite grooves, the core is nearly completely severed so that it is strongly weakened. Moreover, the thread profile along the insertion blends harmoniously with the thread that forms a single piece with the core i.e., there are no cutting heads, in the proper sense of the word, projecting over the thread and possessing an increased cutting function which is needed especially for concrete.

U.S. Pat. No. 5,385,439 teaches a thread-forming screw. Along a smaller part of its thread, this screw has forming elements which stand out radially from the thread. The forming elements are one-piece with the core and the rest of the thread. A drawback resides in that, if the forming elements are to have sufficient hardness for cutting stone, the screw is not corrosion-resisting, because only non-corrosion-resisting steels can be hardened. On the other hand, non-corrosion-resisting screws do not comply with the requirements, set by safety standards, for the durability of concrete which is for instance exposed to humidity.

OBJECT AND SUMMARY OF THE INVENTION

It is an object of the invention to improve a screw of the generic type so that its stability is ensured even in the case of important screw-in forces.

The gist of the invention resides in providing cutting elements with cutting heads of a hardened metal in a screw which consists substantially of a corrosion-resisting metal, the cutting heads being disposed within the thread and the cutting elements being inserted in the core in tilt-resisting manner. In this way, the cutting heads are capable of being loaded even by a high frictional forces on the wall of the drill hole, while a predominant portion of the thread is simultaneously corrosion-resisting and cannot be damaged in the long run.

BRIEF DESCRIPTION OF THE DRAWINGS

Additional advantages and details will become apparent from the ensuing description of three exemplary embodiments, taken in conjunction with the drawing, in which FIG. 1 is a plan view of a screw having a cutting element according to a first embodiment;

FIG. 2 is a cross-sectional illustration of the screw along the line II—II of FIG. 1;

FIG. 3 is a lateral view of a cutting element according to the first embodiment;

FIG. 4 is a plan view of the cutting element according to FIG. 3;

FIG. 9 is a plan view of a screw with a cutting element according to a third embodiment;

FIG. 10 is a cross-sectional illustration of the screw along the line X—X of FIG. 9;

FIG. 11 is a partial sectional view of the screw along the line XI—XI of FIG. 9; and FIG. 12 is a plan view of a screw according to the arrow XII in FIG. 10.

DETAILED DESCRIPTION OF THE PREFERRED EMBODIMENT(S) OF THE INVENTION

Figure 5:
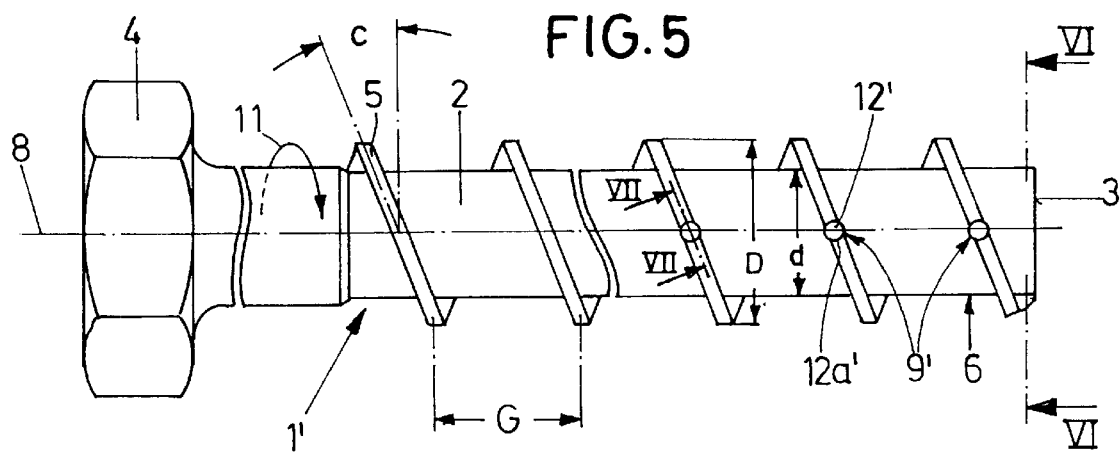
FIG. 5 is a plan view of a screw with a cutting element according to a second embodiment.
Figure 6:
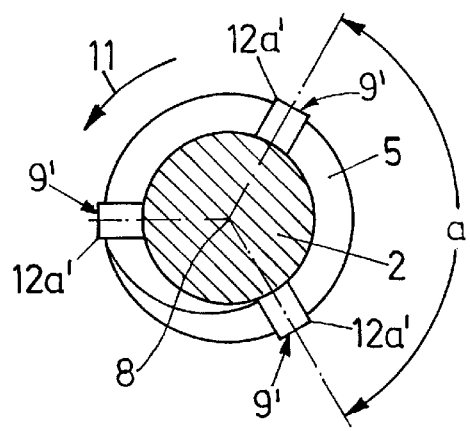
FIG. 6 is a cross-sectional view of the screw along the line VI—VI of FIG. 5.
Figure 7:
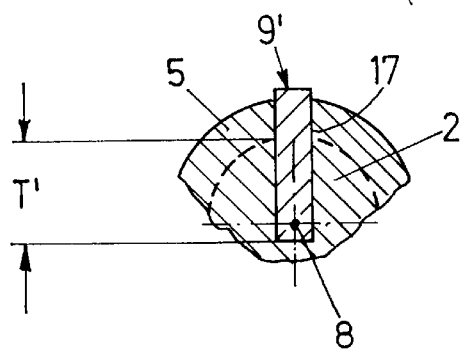
FIG. 7 is a partial sectional view of the screw along the line VII—VII of FIG. 5.

The following is a description of a first embodiment of a screw 1 according to the invention, taken in conjunction with FIGS. 1 to 4. The screw 1 has a cylindrical core 2, which may be beveled in the vicinity of the pilot 3 of the screw 1. Provided on the opposite end of the core 2 is a head 4 of arbitrary design. A rib-type thread 5 is formed on the core 1, having flanks 5*a*, 5*b* and an outside diameter D which exceeds a nominal diameter of a bore into which to drive the screw 1 by 1.0 to 2.5 mm. The nominal diameter of a bore is internationally standardized and amounts to 4, 5, 6, 8, 10, 12, 14, 16, . . . mm.

Along a section 6, which extends from the pilot 3 over part of the length of the thread 5, the core 2 has three grooves 7 of rectangular cross-section and of a depth that is greater than their width. They run substantially parallel to the central longitudinal axis 8 of the screw 1 and are open radially outwards. Adjacent grooves 7 enclose angular distances a of 120° which are identical relative to the central longitudinal axis 8. It is possible to provide any number of grooves 7 instead of three, the angular distance a between neighboring grooves 7 then amounting to 360° divided by the number of grooves 7. The core 2, the head 4 and the thread 5 form a single piece of corrosion-resisting steel, in particular VA steel.

Corresponding to the number of grooves 7, the screw 1 comprises cutting elements 9, each of which having a cutting bar insert 10 and being held, substantially in the drive-in direction 11 of the screw 1, by positive fit and in tilt-resisting manner in a groove 7. The cutting bar insert 10 has a rectangular cross-section matching that of the groove 7. In the radial direction, the cutting bar insert 10 is held by frictional locking or gluing in the groove 7. Cutting heads 12 are provided, forming a single piece with the cutting bar insert 10; they are provided within the thread 5 and project outwards radially from the central longitudinal axis 8. The cutting heads 12 have substantially parallel flanks 13, 14, which are substantially perpendicular to the central longitudinal axis 8, as well as a cutting edge 12a. Relative to a plane 15 that is perpendicular to the central longitudinal axis 8, the flanks 13, 14 are inclined by an angle b, which corresponds to the lead angle c of the thread 5 relative to the plane 15. Consequently, the cutting heads 12 continuously follow the thread 5, the flanks 13, 14 not projecting over the thread flanks 5a, 5b. The cutting bar insert 10 and the cutting heads 12 are made from a hardened and as a rule non corrosion-resisting steel.

The following applies to the dimensions of the individual parts of the screw 1: the depth T of the groove 7 is selected such that it houses the cutting heads 10 entirely. The height H of the cutting heads 12 relative to the circumference of the core 2 is selected such that the cutting heads 12 stand out from the circumference of the thread 5 by approximately 0.05 to 0.4 mm, in particular 0.1 to 0.2 mm. Further, the depth T of the groove 7 relative to the diameter d of the core 2 is selected such that the respective roots 16 of the three grooves 7 are sufficiently spaced so that the overall stability of the core 2 is not affected. The length A of the section 6 is selected for the cutting bar insert 10 to extend over three flights, thus having three cutting heads 12. However, cutting bar inserts 10 of correspondingly greater length may also be provided, which have additional cutting heads 12.

When the screw 1 is driven into a bore, the cutting edges 12a of the projecting cutting heads 12 come into cutting engagement with the wall of the hole. The thread 5, which is soft as compared to the cutting heads 12, deforms slightly when the screw 1 is driven in and is abraded on the wall of the bore. Due to the fact that the cutting heads 12 are harder than the thread 5, abrasion of the cutting heads 12 is considerably lower so that the cutting action thereof is maintained until the screw 1 is entirely screwed in. If the screw 1, which has been driven into the bore, is exposed to corrosive fluids, in particular moisture, only the cutting elements 9 will be destroyed in the course of time. The thread 5 of the corrosion-resisting screw 1 remains free from corrosion, which is why the screw 1 does not lose its hold in the bore.

The following is a description of a second embodiment of the invention, taken in conjunction with FIGS. 5 to 8. Parts that are identical with those of the first embodiment will have the same reference numerals, and parts that differ, but are functionally equivalent, will be denoted by the same reference numerals provided with a prime. Otherwise, reference is made to the description of the first embodiment.

Figure 8:
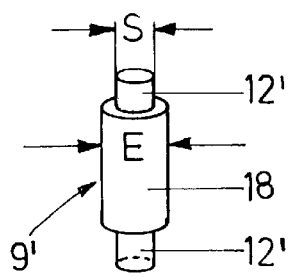
FIG. 8 is a plan view of a cutting element according to a second embodiment.

The screw 1' has bores 17 in the form of a blind hole, which are unilaterally open outwards and extend radially to the central longitudinal axis 8 through the thread 5 and part of the core 2. Following the thread 5, the bores 17 are misaligned relative to the central longitudinal axis 8 by a constant angle a, in the present case by a =120°. In this case, several bores 17—three in the present case—are situated in a plane which also the central longitudinal axis 8 lies on. The depth T' of the bore 17 related to the circumference of the core 2 is greater than d/2, i.e. the bore 17 extends beyond the central longitudinal axis 8. Unlike the first embodiment, this is possible without the stability of the core 2 being affected, since successive bores 17 on the thread 5 are spaced from each other by a third of the lead G of the thread 5, and therefore do not penetrate each other. A cutting element 9', which has a cutting pin insert 18, is held in each bore 17 by positive fit in the screw-in direction 11 and by frictional locking in the radial direction. The cutting pin insert 18, which is not true to scale in FIG. 8, is cylindrical, at its two opposite ends having cylindrical cutting heads 12' which are one-piece therewith, the diameter S of the cutting heads 12' being approximately 1.3 mm and the diameter E of the cutting pin insert 18 being approximately 1.5 mm and 0.05 mm≦E−S≦0.4 mm applying to the difference. Making the diameter S slightly reduced as compared to E is accompanied, during assembly, with the advantage that a cutting head 12' can simply be placed into a bore 17 before the cutting pin insert 18 is pushed into the bore 17 and retained therein in the radial direction by frictional locking. One cutting head 12 at a time is provided on the two ends of the cutting pin insert 18 so that the cutting pin insert 18 can be pushed into the bore 17 in both directions, there being absolutely no need of turning the cutting pin insert 18 around. Once the cutting pin inserts 18 are pushed into the bore 17, the cutting heads 12' are ground to length so that they project over the thread 5 as described above. The cutting mechanism of driving a screw 1' into a bore is the same as with the screw 1.

A third embodiment of the invention is described in the following, taken in conjunction with FIGS. 9 to 12. Identical parts have the same reference numerals as with the first embodiment, to the description of which reference is made. Parts which differ in construction, but are functionally identical have the same reference numerals provided with two primes. As compared to the second embodiment, the essential difference resides in the design of the cutting element 9''.

The thread 5', which is only diagrammatically outlined in FIG. 9, comprises two parallel flanks 19, 20 as seen in FIG. 11, which pass via a bevel 21 into the core 2. The angle g of the bevel is approximately 45°. FIG. 11 shows a wall 22 of a bore, it being seen that the bevel 21 finds itself at least substantially in the vicinity between the core 2 and the wall 22 of the bore. A chamber 23 is formed between the core 2 and the wall 22 of the bore, the material cut out when the screw 1'' is threaded in being carried off through this chamber 23. The bevel 21 is provided purely for reasons of strength implementation.

As in the second embodiment, bores 17'' in the form of blind holes unilaterally open outwards are provided in the core 2, the depth of which is T''>d/2. The cutting elements 9'' are disposed in the bores 17'', having an annular cylindrical cutting pin insert 18'', which is provided circumferentially with a knurled straight parallel pattern 25 of lengthwise extension. A rib-type cutting head 12'' is provided at the end of the round body 24 which is the top end in FIG. 11; it has plane cutting element flanks 26 which are inclined towards each other and the directions of lengthwise extension of which are parallel. The width of the cutting element flanks 26 tapers in the radial direction. The cutting element flanks 26 are arranged such that they stand out beyond the flanks 19, 20 when they are projected, as seen in FIG. 11, on the cross-section of the thread 5". The cutting element flanks 26 pass via likewise plane cutting-element bevels 27 into the pin 18". The cutting element bevels 27 enclose the same angle g as the bevels 21. The cutting element surface 28 located between the cutting element flanks 26 is beveled and projects as compared to the surface 29 disposed between the flanks 19 and 20 of the thread 5".

For assembly, the pin 18" is pushed into the bore 17" so that the flanks 19, 20 of the thread 5" and the cutting element flanks 26 are parallel in their lengthwise extension. The knurled straight parallel pattern 25 prevents any rotation of the pin 18" to take place in the bore 17". The pin 18" is held by frictional engagement in the radial direction relative to the axis 8 and by positive locking perpendicular thereto. The cutting mechanism upon driving the screw 1" into a bore is the same as with the screw 1'. The cutting edges 12a" are formed by the edges of the cutting head 12" which lead in the screw-in direction 11 and project over the thread 5" in particular by 0.2 to 0.3 mm.

A special advantage resides in that on the one hand the outer shape of the cutting head 12 substantially follows the shape of the thread 5", it being possible in this regard to drive the screw 1" in regularly. On the other hand, the cutting head 12", which stands out from the thread 5", ensures that the cutting job in the wall is done primarily by itself and not by the thread 5".

Since the cutting element 9" consists of especially hardened material as with the first and second embodiment, the wear of the softer, but corrosion-resisting thread 5" is strongly reduced.

What is claimed is:

1. A corrosion-resisting, self-tapping screw, in particular a concrete screw, to be driven into a wall of a bore, comprising a substantially cylindrical core (2) of corrosion-resisting metal, which has a central longitudinal axis (8);

a thread (5; 5"), which is integral with the core (2); and at least one cutting element (9'; 9"), which has at least one cutting head (12'; 12") for cutting engagement with the wall of the bore;

with the at least one cutting element (9'; 9") being inserted in the core (2), being tightly joined thereto, and consisting of a metal which is harder than the cylindrical core of the screw; and with the at least one cutting head (12; 12'; 12") being disposed only in the thread (5; 5");

wherein the at least one cutting head (12'; 12") projects over the thread (5; 5") radially to the central longitudinal axis (8);

wherein the core (2) comprises at least one externally open bore (17; 17"), which is radial to the central longitudinal axis (8); and wherein the at least one cutting element (9'; 9") is a cutting pin insert (18; 18") with at least one cutting head (12'; 12"), which is formed in a single piece therewith;

with the cutting pin insert (18; 18") being held in the at least one bore (17; 17").

2. A screw according to claim 1, wherein the cutting head (12'; 12") projects over the thread (5; 5") by 0.05 to 0.4 mm.

3. A screw according to claim 1, wherein each cutting head (12') comprises cutting element flanks (26) which are substantially parallel to each other.

4. A screw according to claim 3, wherein a lead angle of the thread (5") and a lead angle of the cutting element flanks (26) are substantially equal, each referred to a plane (15) perpendicular to the central longitudinal axis (8).

5. A screw according to claim 1, wherein the cutting element (9') is substantially cylindrical.

6. A screw according to claim 1, wherein the cutting head (12") has a rib-type shape.

7. A screw according to claim 1, wherein the cutting head (12") projects over the thread (5").

* * * * *